(12) United States Patent
Bilodeau et al.

(10) Patent No.: US 7,606,452 B2
(45) Date of Patent: Oct. 20, 2009

(54) OPTICAL FIBER FUNDAMENTAL MODE FIELD EXPANDER

(75) Inventors: Francois Bilodeau, Nepean (CA); Bernard Malo, Gatineau (CA); Stephen Mihailov, Kanata (CA)

(73) Assignee: Her Majesty the Queen in Right of Canada, as represented by the Minister of Industry, through the Communications Research Centre Canada, Ottawa, Ontario (CA)

( * ) Notice: Subject to any disclaimer, the term of this patent is extended or adjusted under 35 U.S.C. 154(b) by 0 days.

(21) Appl. No.: 12/190,861

(22) Filed: Aug. 13, 2008

(65) Prior Publication Data

US 2009/0060417 A1   Mar. 5, 2009

Related U.S. Application Data

(60) Provisional application No. 60/968,613, filed on Aug. 29, 2007.

(51) Int. Cl.
G02B 6/26 (2006.01)
G02B 6/255 (2006.01)

(52) U.S. Cl. .............................. 385/43; 385/50; 385/96
(58) Field of Classification Search ........................ None
See application file for complete search history.

(56) References Cited

U.S. PATENT DOCUMENTS 4,737,004 A   4/1988   Amitay et al.
4,895,423 A   1/1990   Bilodeau et al.
6,768,849 B2   7/2004   DiGiovanni
7,184,623 B2*  2/2007   Cai et al. ...................... 385/28
2003/0103724 A1  6/2003   Duck et al.
2006/0029322 A1*  2/2006   Mihailov et al. .............. 385/12

OTHER PUBLICATIONS

Grobnic et al, IEEE Photon. Technol. Lett. 16 (11), pp. 2505-2507 (2004).
Emkey et al, Lightwave Technol. 5, pp. 1156-1164 (1987).
Hanafusa et al, Electron Lett. 27 (21), pp. 1968-1969 (1991).
Jedrzejewski et al, Electron Lett. 22 (2), pp. 105-106 (1986).
Love et al, IEEE Proceedings Journal vol. 138, No. 5, pp. 343-354 (1991).

* cited by examiner

*Primary Examiner*—Omar Rojas
(74) *Attorney, Agent, or Firm*—Teitelbaum & MacLean; Neil Teitelbaum; Doug MacLean

(57) ABSTRACT

A device for providing an expanded mode field from a single mode optical waveguide is formed by fusing a length of single mode optical fiber with a length of fiber rod absent a cladding and adiabatically tapering the fused region. The length of single mode fiber has a core having a refractive index $n_{co}$ and a cladding having a refractive index $n_{cl}$, wherein $n_{cl}<n_{co}$ and wherein the cladding has an outer diameter $\rho$. The length of fiber rod absent the cladding has a refractive index of the fiber rod is substantially the same as the cladding index $n_{cl}$ of the single mode optical fiber. The outer diameter of the length of fiber rod is $\rho$, the same as the cladding diameter of the single mode fiber.

11 Claims, 5 Drawing Sheets

OPTICAL FIBER FUNDAMENTAL MODE FIELD EXPANDER

CROSS-REFERENCE TO RELATED APPLICATIONS

The present invention claims priority from U.S. Provisional Patent Application No. 60/968,613 filed Aug. 29, 2007, which is incorporated herein by reference.

FIELD OF THE INVENTION

The present invention relates to a device for expanding the fundamental mode field of a single mode waveguide into a large numerical aperture, large diameter, air-guided multi-mode waveguide. This device can be used to excite the fundamental mode of large numerical aperture and diameter matched waveguides.

BACKGROUND OF THE INVENTION

There are several applications where the exclusive excitation of the fundamental mode of a multimode waveguide structure is advantageous. For some fiber Bragg grating (FBG) sensor applications, refractive index modulated distributed Bragg gratings are fabricated in multimode waveguides, for example in sapphire fiber rods as disclosed by Grobnic et al in *IEEE Photon. Technol. Lett.* 16 (11), p. 2505-2507 (2004) incorporated herein by reference. It is desirable to obtain a single mode response in the reflection spectrum rather than a multimode response, as the spectral bandwidth of the single mode response is narrower. An improved signal to noise ratio results when only one mode is being inspected rather than the superposition of hundreds if not thousands of modes that can be supported by the multimode fiber.

As well, expanding the mode field diameter (MFD) of a single-mode fiber (SMF) has many advantages in terms of reducing the local power density while increasing the effective free-space collimation distance (or 'Rayleigh range'). Reducing the local power density allows for the transmission of higher power densities between optical components while reducing the possibility of fiber damage at coupling points. The capability of reducing local power densities at coupling points is important for multi-component fiber optic systems.

For high-powered fiber lasers that produce in excess of 1 kW average power, large mode area (LMA) fibers are required so that the optical intensities achieved are below the damage threshold of the material. As LMA fibers are multi-mode waveguide structures, it is desirable to have light propagate in the fundamental mode of the waveguide in order to produce high quality diffraction limited beam output. This is typically achieved by using LMA fibers that support the propagation of only a few modes wherein excitation of higher order modes is suppressed.

Several technologies for expanding the fundamental mode field of a single-mode optical fiber have been developed: for example the coupling of microlenses such as graded-index fiber lenses (GRIN) as disclosed by Emkey et al. in *J. Lightwave Technol.* 5, pp. 1156-1164 (1987) incorporated herein by reference; diffusion of core dopants, also known as Thermally Expanded Core (TEC) techniques as disclosed by Hanafusa et al. in *Electron. Lett.* 27 (21), p. 1968-1969 (1991) incorporated herein by reference; residual elastic stress based approaches as taught by DiGiovanni et al in U.S. Pat. No. 6,768,849; 'free-space' beam expansion via SMF coupling to cladding matched materials as taught by Duck et al in US Patent Application 200310103724 A1; and by physical tapering of SMFs as disclosed by Jedrzejewski et al. in *Electron. Lett.* 22 (2), pp. 105-106 (1986) and Amitay et al in U.S. Pat. No. 4,737,004.

These prior art single mode expansion techniques provide a useful function, however they are known to suffer from some limitations depending upon their application. Mode expansion techniques that require the inclusion of a microlens to collimate the expanded beam, as described by Emkey or Duck, need to have stable and critical alignment in order to reduce coupling losses of the expander. In the case of GRIN lenses, precise lens lengths are also required to obtain the correct focal length that expands the fundamental mode field of a SMF. The optical characteristics of GRIN lenses are extremely sensitive to their length so fabricating connectors from GRIN lens beam expanders requires careful control of the fiber position in the ferrule. Diffusion of the core dopants has been shown to expand the size of the fundamental mode of SMF but requires extremely high temperatures and very long processing times. Such high temperature processing can weaken the fiber or distort its shape.

Mode field expansion through tapering of SMF, as disclosed by Jedrzejewski and Amitay, eliminates the need for lenses. For step index fibers the normalized frequency or V number is given by:

$$V = \frac{2\pi r}{\lambda}\sqrt{(n_{co}^2 - n_{cl}^2)} \quad (1)$$

where $r$ is the core radius, $\lambda$ is the wavelength and $n_{co}$ and $n_{cl}$ are the refractive indices of the core and cladding respectively. For single mode operation, $V \leq 2.405$. When a fiber is tapered, by using the hydrogen flame brushing technique for example (see Bilodeau et al U.S. Pat. No. 4,895,423 incorporated herein by reference) the ratio of cladding/core radii remains constant however V decreases. As disclosed in Love et al *IEE Proceedings Journal* vol. 138, no. 5, p. 343-354 (1991), incorporated herein by reference, when single mode optical fiber is tapered down such that the normalized frequency or V number of the taper is V<0.84, the fundamental $LP_{01}$ mode is no longer confined to the core but instead is guided by the cladding-air interface resulting in a mode field with the same diameter as the tapered fiber.

In order to minimize coupling of the fundamental mode into higher modes within the taper, the tapering rate along the length of the fiber must be adiabatic. If $z$ is the distance along the taper and $\rho$ is the local taper radius then the adiabatic condition can be written as:

$$\left|\frac{d\rho}{dz}\right| \leq \frac{\rho}{z_b} \quad (2)$$

$$z_b = \frac{2\pi}{(\beta_1 - \beta_2)}$$

where $z_b$ is a 'beat length', $\beta_1$ is the propagation constant of the fundamental $LP_{01}$ mode and $\beta_2$ is the propagation constant for the $LP_{02}$, which is the closest and most likely mode to which coupling will occur. There are limitations to the amount of mode field expansion that is possible by 'down' tapering existing commercially available SMF, typically a factor of 5 to 10.

Considering sensors in fiber rod waveguides such as sapphire fiber, (for example fiber Bragg gratings, Fabry-Perot based sensors), in order to maximize the coupling of the fundamental mode ($LP_{01}$) from the beam expander to the sapphire rod, it is necessary to expand the mode field such that the difference in the ultimate fundamental MFDs of the expander and the sapphire fiber rod are minimized. As well, the numerical aperture (NA) and the outer diameter of the expander should be closely matched to the rod waveguide in order to achieve efficient coupling of the $LP_{01}$ mode of the expander to the $LP_{01}$ mode supported by sapphire rod. The Gaussian shaped mode field launched by the expander that is used to excite the fundamental mode of the rod waveguide, must be large enough that the edges of the mode field extend to and are guided by the core-air interface of the sapphire rod. Launching with an expanded mode field with a MFD that is much smaller than the $LP_{01}$ mode supported by the rod waveguide, will result in divergence of the mode field inside the fiber rod until it reaches the core-air interface of the rod resulting in coupling of the fundamental mode into higher order modes within the rod waveguide. As the narrowest standard sapphire optical fiber rods are typically 125-150 μm in diameter, down tapering alone cannot sufficiently expand the mode field from a single mode fiber.

High factors of mode field expansion are possible when a fiber is 'up' tapered as taught by Amitay et al in U.S. Pat. No. 4,737,004. Although this prior art single mode expansion techniques provide a useful function by facilitating expansion of the fundamental single mode of the fiber to arbitrarily large mode fields, it is not easily manufactured from commercially available fibers. These expanders are made by maintaining some of the remaining tapered section of single mode fibers that are drawn from fiber performs through preferential cleaving along the length of the fiber as it is being drawn. As such it is not ideally suited for mass production. As a cladding is present on the fiber 'up' taper, as taught by Amitay in U.S. Pat. No. '004', the numerical aperature (NA) of the expander is similar to that of single mode fiber, which is typically ~0.1.

For optimal bi-directional coupling, the numerical aperture (NA) of the $LP_{01}$ mode of the expander and the NA of the $LP_{01}$ mode of the target waveguide into which the fundamental mode is launched, need to be substantially matched in order to avoid excess coupling loss. For FBG sensors, the beam expansion technique needs to be bi-directional, meaning that as the fundamental mode exiting the SMF is subsequently expanded, similarly a large MFD fundamental mode received by the expander must be coupled into the single mode fiber of the expander when the mode field is propagating in the opposite direction. The NA of sapphire rod fibers is >1. It is likely then that a large MFD signal collected by an 'up' taper as taught by Amitay, would result in large amounts of excess loss due to NA mismatch.

It is an objective of this invention to overcome the aforementioned limitations within the prior art systems for fabrication of mode field expanders that are compatible with high NA fiber rods absent a cladding.

SUMMARY OF THE INVENTION

An apparatus for producing an expanded mode field from a single mode optical waveguide comprising:
   a length of single mode fiber having at least one core and a cladding with the cladding material having a lower refractive index $n_{cl}$ than the core index $n_{co}$, and cladding diameter ρ;
   a length of fiber rod absent a core which possesses a refractive index the same as the cladding index $n_{cl}$ and an outer diameter ρ the same as the cladding diameter of the aforementioned single mode fiber;
   a fusion splice of the single mode fiber and fiber rod;
   adiabatic tapering of the aforementioned spliced single mode fiber and fiber rod.

In accordance with the invention there is further provided, a device for providing an expanded mode field from a single mode optical waveguide, comprising:
   a length of single mode fiber having at least a core having a refractive index $n_{co}$ and a cladding having a refractive index $n_{cl}$, wherein $n_{cl}<n_{co}$ and wherein the cladding has an outer diameter ρ;
   a length of fiber rod absent at cladding wherein the refractive index of the fiber rod is same as the cladding index $n_{cl}$ of the single mode optical fiber, wherein the outer diameter of the length of fiber rod is ρ, the same as the cladding diameter of the single mode fiber;
   wherein an end of the length of single mode fiber and an end of the length of rod are fused together forming a fusion splice; and,
   wherein a region including the fusion splice and a portion of the fiber rod and a portion of the single mode fiber about the fusion splice are adiabatically tapered.

In accordance with another aspect of the invention, there is provided a method for exciting the fundamental mode of a multimode fiber rod absent a cladding which consists of adiabatically tapering a fused single mode fiber and fiber rod combination such that the normalized frequency or V number of the single mode fiber portion of the fused single mode fiber/fiber rod combination is V<0.5. The tapered region of the fused single mode fiber and fiber rod combination has a fundamental $LP_{01}$ mode that is guided by the cladding-air interface in the tapered region. Adiabatic up tapering of the fiber rod from the fusion location results in the expansion of the $LP_{01}$ mode without coupling to higher order modes. The expanded mode field exiting the fiber rod portion is then used to predominantly excite the fundamental mode of an external multimode fiber rod absent a cladding. Predominantly is defined here to mean the largest percentage of energy input into the external multimode rod couples into the $LP_{01}$ mode. Other modes may be excited but more energy is in the $LP_{01}$ mode than any single excited mode.

BRIEF DESCRIPTION OF DRAWINGS

The invention is now described with reference to the drawing in which:

FIG. 2b is a 3-dimensional plot of the near field measurement present in FIG. 2a.

DETAILED DESCRIPTION OF THE INVENTION

Figure 1A:
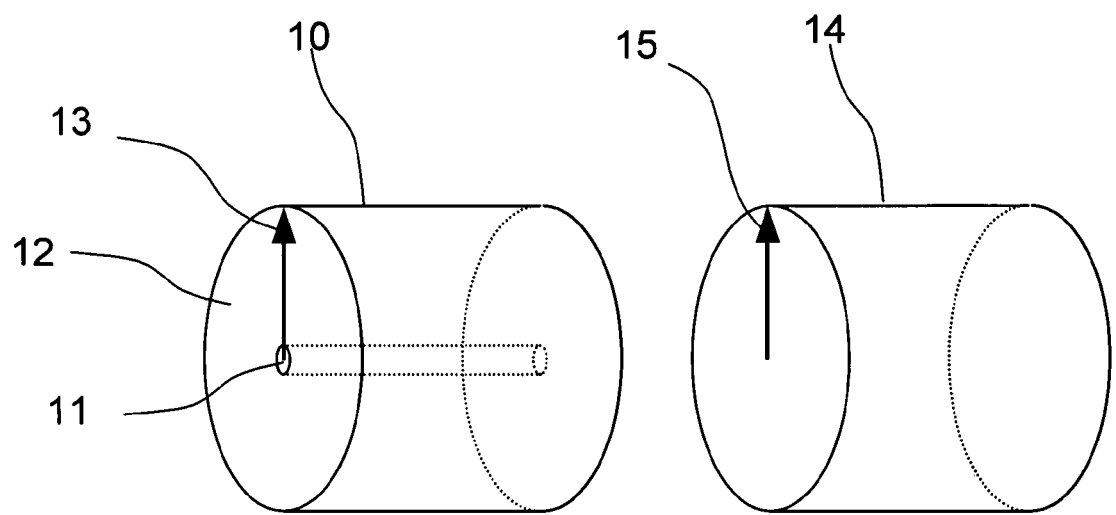
FIG. 1a is a schematic diagram of the single mode fiber and outer diameter match fiber rod absent a core.

Referring to FIG. 1a, a single mode fiber 10 has a core 11 with refractive index $n_{co}$ and a cladding 12 with refractive index $n_{cl}$ such that $n_{cl}<n_{co}$. The single mode fiber cladding has a radius 13, which for standard telecommunication single mode fibers is typically ρ=62.5 μm. For standard telecommunication fibers the cladding material is typically fused silica. The fiber rod 14 is made of the same material as cladding material of the single mode fiber 10, and the fiber rod radius 15 is the same as the single mode fiber radius 13. The refractive index of 14 is the same as the single mode fiber cladding 12, namely $n_{cl}$. In a preferred embodiment, the single mode fiber 10 is a silica based fiber with a germanium doped core and pure silica cladding such as Corning SMF-28 which has an outer diameter 2ρ=125 μm. The fiber rod 14 is a silica rod absent a core with an outer diameter 2ρ=125 μm.

Figure 1B:
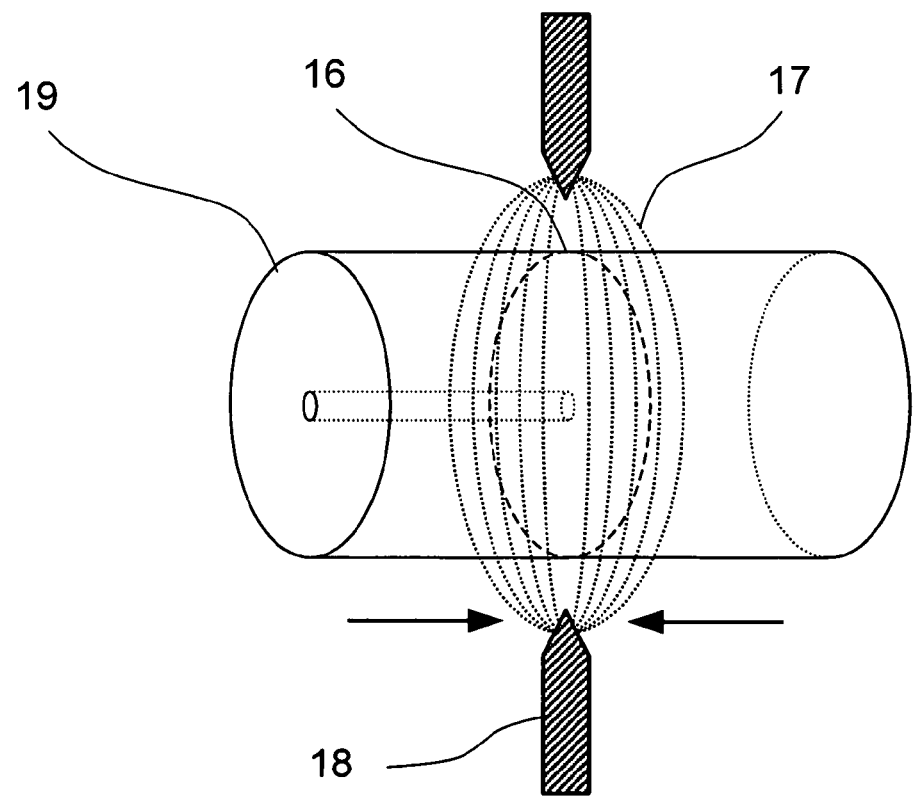
FIG. 1b is a schematic diagram of the arc fusion splicing of the single mode fiber and fiber rod.

Shown schematically in FIG. 1b, the two fibers 10 and 14 are fused together at splice location 16 with an electrical arc 17 generated between arc electrodes 18 to make a combined SMF/fiber rod waveguide 19.

Figure 1C:
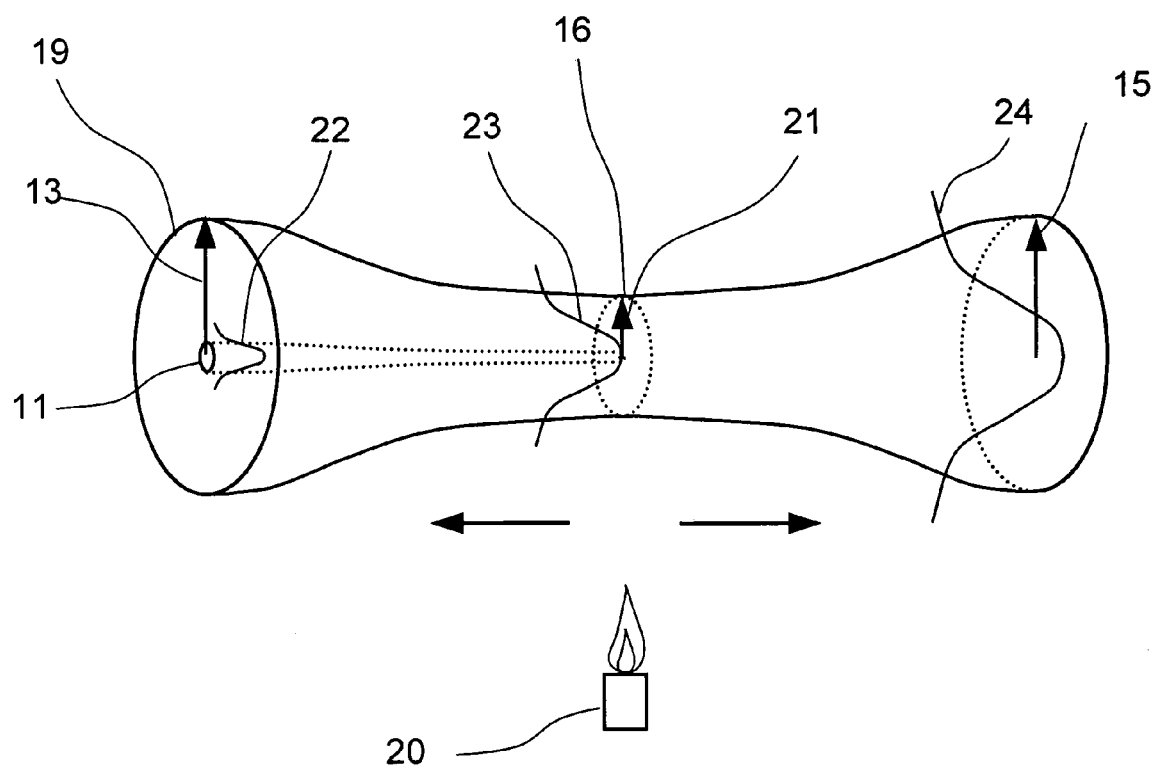
FIG. 1c is a schematic diagram of the tapering of the fused single mode fiber/fiber rod combination and the expansion of the fundamental mode from the single mode fiber

Referring to FIG. 1c, the combined SMF/fiber rod waveguide 19 was tapered using a fused biconic tapered coupler fabrication jig with a oxy-hydrogen flame 20 as described by Bilodeau et al U.S. Pat. No. 4,895,423. The combined SMF/fiber rod waveguide 19 is then elongated in the flame 20 by moving two translation stages in opposite directions and sweeping the flame along the fiber length. It was found that for optimal beam expansion performance, the fusion splice 16 must be located in the center of the flame sweep length. The combined SMF/fiber rod waveguide 19 is then elongated until the V number single mode fiber portion of the rod waveguide is V<0.5. For SMF-28 fiber this corresponds to a taper waist radius 21 of ~16 μm. The rod portion of the SMF/fiber rod taper region has a significantly higher V number. At 1550 nm the V number of the 16 μm diameter rod portion of the taper is ~70. Despite the large V number of the rod portion of the taper, the rod portion propagates only the excited single mode exiting the single mode fiber portion of the taper. The length of the taper must be long enough that the variation in radius with position, ρ(z), is consistent with the adiabatic condition Eq. (2).

Referring again to FIG. 1c, the mode field 22 in the untapered single mode fiber portion of the combined SMF/fiber rod waveguide 19 is guided within the core 11. As the fiber is tapered, the ratio of the cladding/core radii remains constant, however V decreases. Love et al. disclosed that the transition of the fundamental $LP_{01}$ mode from a core-cladding guided into a cladding-air guided mode occurs when $$V < V_{cc} \cong \sqrt{\frac{2}{\ln S}} \left\{ 1 + \frac{0.26}{\ln S} \right\}^{-\frac{1}{2}} \qquad (3)$$

where S is the ratio of cladding to core radii and $V_{cc}$ is the normalized cutoff frequency. When the V of the tapered region is 0.5, the $LP_{01}$ mode 23 is guided by the cladding-air interface. With an adiabatic 'up' tapering, the $LP_{01}$ mode continues to be cladding-air guided with negligible coupling to higher order modes. At the exit of the taper, the MFD of $LP_{01}$ mode 24 is limited by the initial diameter 15 of the fiber rod. Because of the absence of a cladding at the end of the expander, the numerical aperture of the device $\{NA=(n_{co}^2-n_{cl}^2)^{1/2}\}$ is >1. For retroreflective coupling of a signal from a sapphire rod to a single mode fiber, the NA of the expander should be as substantially matched to that of the beam expander. For sapphire fiber rods absent a cladding, their NA is ~1.4.

Figure 2A:
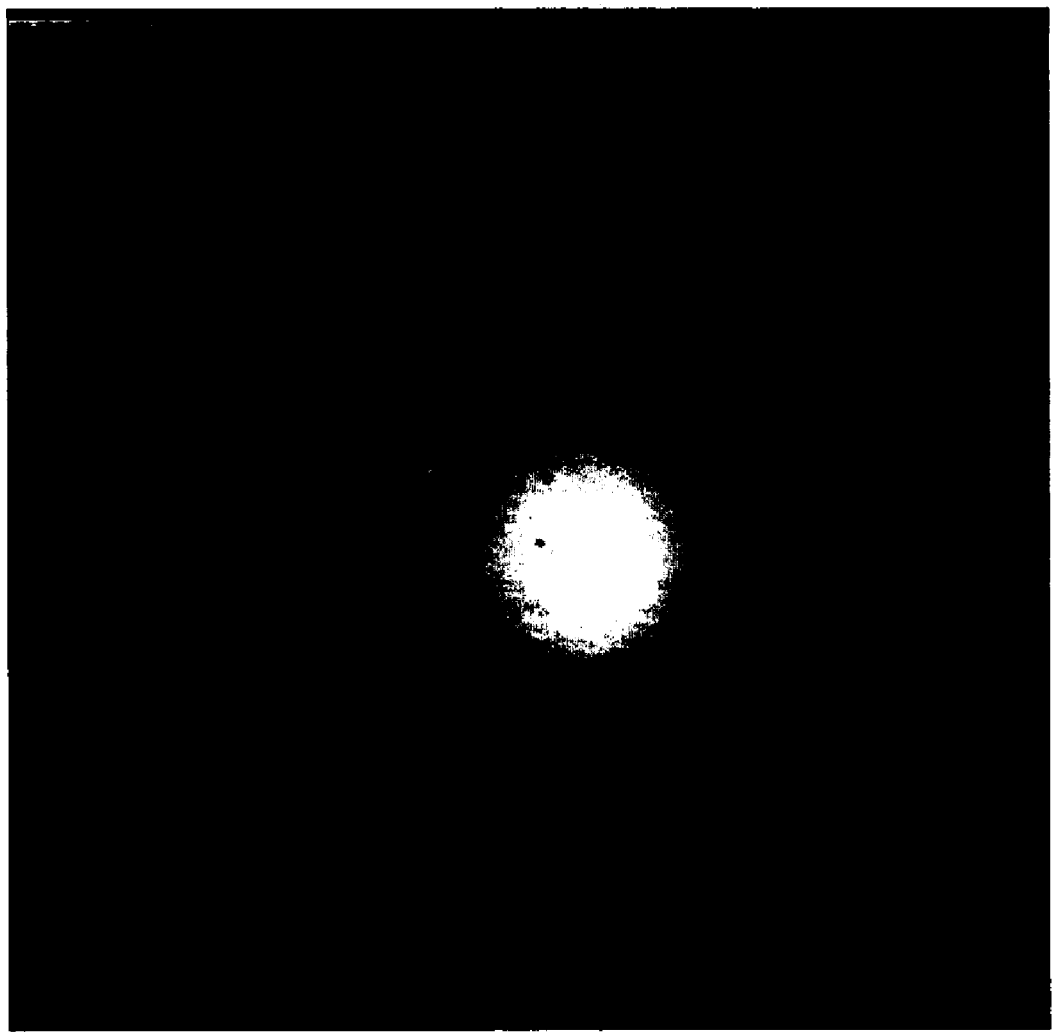
FIG. 2a is a near field measurement of the mode field produced by optical fiber fundamental mode field expander.
Figure 2B:
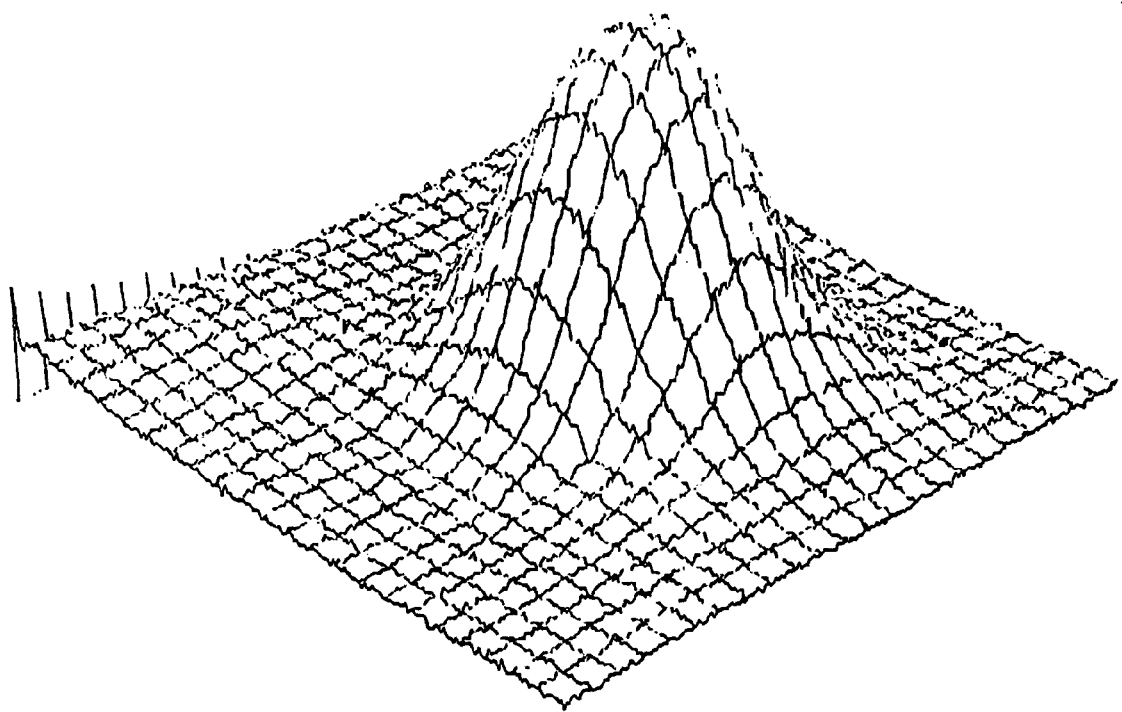

FIG. 2a shows the near field measurement of the mode field exiting the beam expander taken with an infrared IR camera.

Figure 3A:
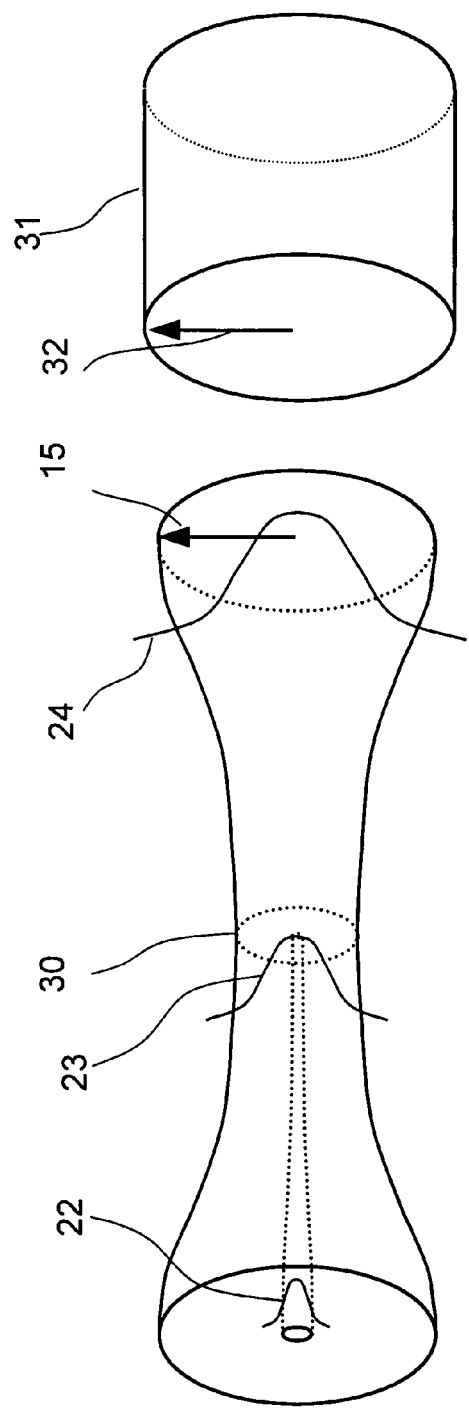
FIGS. 3a and b is a schematic representation of how the fundamental $LP_{01}$ mode of an external fiber rod absent a cladding can be excited by the optical fiber fundamental mode field expander.
Figure 3B:
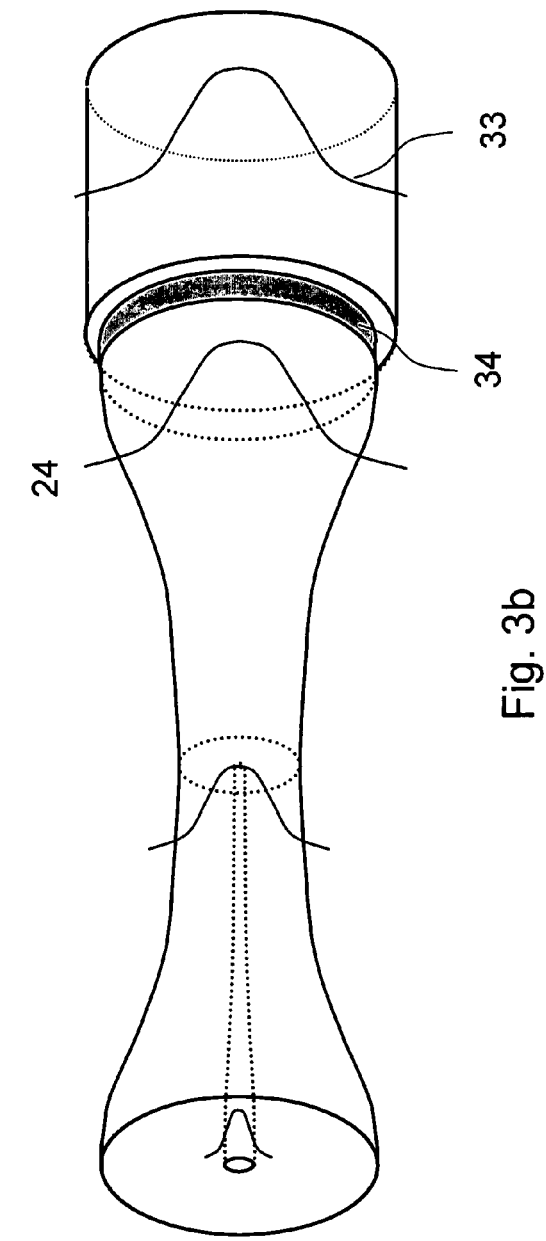

In order to excite the $LP_{01}$ mode of a multimode rod waveguide 31, such as a sapphire fiber absent a cladding, the arrangement shown in FIG. 3a can be used. The fundamental mode 24 generated by the optical fiber fundamental mode field expander 30, can be coupled into the waveguide 31, when the waveguide 31 is placed proximate the expander 30. In FIG. 3b, the fundamental mode 24, excites the fundamental mode 33 of waveguide 31 when the numerical apertures of the $LP_{01}$ mode 24 and the $LP_{01}$ mode 33 are closely matched and the expander diameter 15 and the multimode rod waveguide diameter 32 are closely matched as well. The coupling surfaces between the two rod waveguides are refractive index matched with for example, an index matching oil 34.

What is claimed is:

1. A device for providing an expanded mode field from a single mode optical waveguide, comprising:
    a length of single mode fiber having a core with a refractive index $n_{co}$ and a cladding with a refractive index $n_{cl}$, wherein $n_{cl<nco}$ and wherein the cladding has an outer diameter 2ρ;
    a length of fiber rod absent a cladding wherein the refractive index of the fiber rod is substantially the same as the cladding index $n_{cl}$ of the single mode optical fiber, wherein the outer diameter of the length of fiber rod is 2ρ, substantially the same as the cladding diameter of the single mode fiber;
    wherein an end of the length of single mode fiber and an end of the length of rod are fused together forming a fusion splice; and,
    wherein a region including the fusion splice and a portion of the fiber rod and a portion of the single mode fiber about the fusion splice are adiabatically tapered.

2. A device as defined in claim 1, wherein an end of the fiber rod is coupled to an end of a multi-mode rod.

3. A device as defined in claim 2 wherein the multimode rod is a sapphire fiber rod.

4. A device as defined in claim 2 wherein the multimode rod is a different material than the fiber rod.

5. A device as defined in claim 4 wherein an index matching fluid is disposed between the multimode rod and the fiber rod ends.

6. A device as defined in claim 1 wherein un-tapered ends of the single mode fiber and the fiber rod are substantially the same diameter.

7. A device for providing an expanded mode field comprising:
    a multimode fiber rod absent a cladding fused to a single mode fiber having a same outer diameter as the multimode rod, wherein a portion of the fused fiber rod and a portion of the single mode optical fiber are adiabatically tapered such that a normalized frequency or V number of the single mode fiber portion of the fused single mode fiber is less than 0.5 wherein the single mode fiber has a core and a cladding and wherein refractive index of the cladding is substantially the same as the refractive index of the multimode fiber rod.

8. A device as defined in claim 7, wherein the refractive index of the multimode fiber rod is substantially uniform and unvarying.

9. A device as defined in claim 8, wherein an un-tapered portion of the multimode rod is the same diameter as an un-tapered portion of the single mode optical fiber.

10. A device as defined in claim 7 wherein the tapered portion of the fused single mode fiber and the tapered portion of the fiber rod have a fundamental $LP_{01}$ mode that is guided by the cladding-air interface in the tapered region.

11. A device as defined in claim 10, wherein an end of the fiber rod is coupled to an end of a multi-mode rod absent a cladding, and wherein when light is launched into the single mode fiber, adiabatic up tapering of the fiber rod from the fusion splice location results in the expansion of the $LP_{01}$ mode without coupling to higher order modes and wherein the expanded mode field exiting the fiber rod portion predominantly excites the fundamental mode of the multimode fiber rod.

* * * * *